Patented Dec. 8, 1953

2,661,806

UNITED STATES PATENT OFFICE 2,661,806

CONTROL FOR PROPELLER GOVERNOR HAVING DELAYED PROPELLER SPEED REGULATION

Paul T. Nims and Brent C. Jacob, Jr., Detroit, Mich., assignors to Chrysler Corporation, Highland Park, Mich., a corporation of Delaware Application February 27, 1948, Serial No. 11,498

7 Claims. (Cl. 170—160.2)

This invention relates to stabilization of governor-controlled apparatus. More specifically, it relates to a delaying means associated with a propeller-pitch-changing apparatus that regulates the speed of the propeller.

Let us consider a power plant where there is a considerable mass rotating at high speeds, such as an assembly comprising an airplane propeller, a gas turbine driving the propeller, and a compressor driven by the turbine and supplying high-pressure air combinable with fuel to form hot gases driving the propeller. If the speed of such a power plant is controlled by adjustment of propeller pitch, there is considerable danger in overloading that might arise, for example, upon too sudden an increase in pitch for the sake of speed reduction, because the inertia of the power plant would prevent a rapid decrease in speed, and so there would be a period in which the combination of the temporarily maintained speed and the increased torque due to increased propeller pitch might produce dangerous overloading in the reduction gears transmitting drive from the turbine to the propeller. If the propeller pitch is rapidly reduced for the sake of an increase in propeller speed, the sudden reduction in propeller pitch produces a sudden reduction in thrust resulting in an undesirable slowing down of airplane speed.

An object of the present invention is to introduce a delaying means in a power plant of the above type. The result will be in the case of increase in propeller pitch that the change in propeller pitch will be sufficiently slow to match the slow change in power plant speed, and thereby overloading is avoided. In the case of decrease in propeller pitch the slowness of response will be sufficient to prevent an undesired slowing down of airplane speed that would result from the too sudden reduction in propeller thrust produced by decrease in propeller pitch.

A further object of the present invention is to provide a disabler for the aforementioned delaying means operable at selected circumstances. For example, if the airplane is approaching a field for a landing, it will be operated at full propeller speed and reduced load. If the pilot decides not to land the plane, he increases the fuel rate. This tends to increase the propeller speed, but the governor tends to maintain the full propeller speed for which it is set. It is important that the governor act quickly to increase propeller pitch and thus to maintain that speed, or otherwise the increased speed and increased load resultant from increase in fuel rate may destroy the power plant of the airplane.

Other objects will appear from the disclosure.

Figure 1:
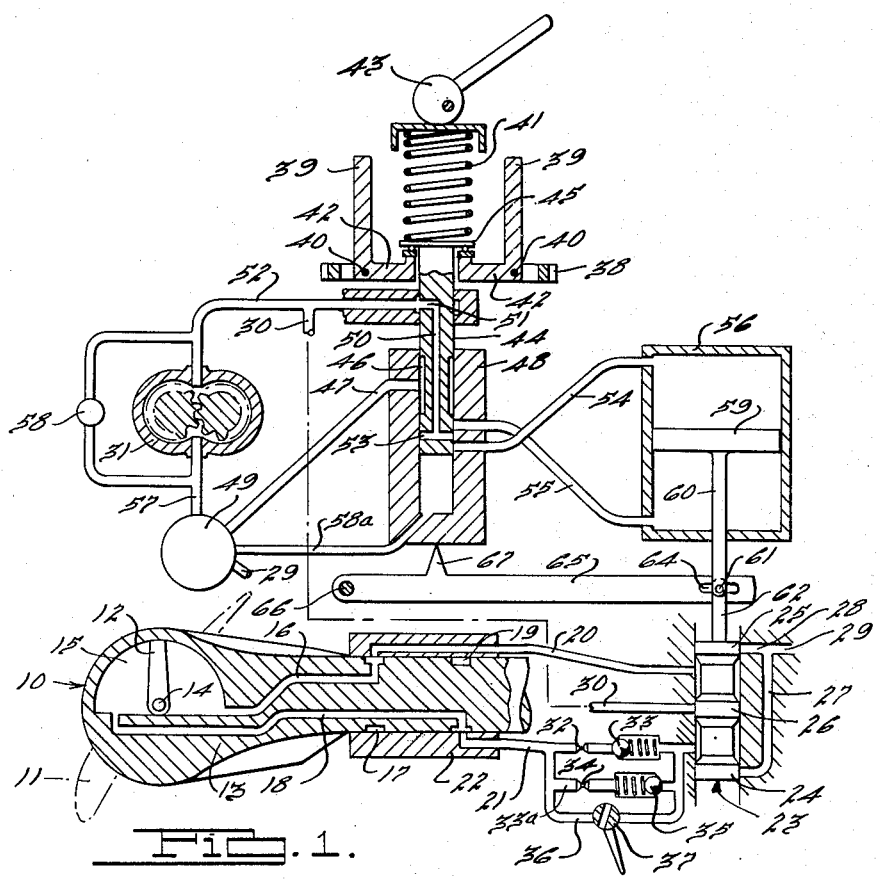
Fig. 1 is a schematic view of a control for a propeller governor.

The reference character 10 designates a propeller of the variable-pitch type having propeller blades 11. The pitch of the propeller blades is controlled by an hydraulically adjusted vane 12 mounted in a rotatable hub member 13 of the propeller. The vane 12 is pivoted at 14 in a chamber 15 in the hub member 13. A passage 16 leads from the portion of the chamber 15 to the right of the vane 12 to an annular groove 17, and a passage 18 leads from the portion of the chamber 15 to the left of the vane 12 to an annular groove 19. Passages 20 and 21 lead respectively through a stationary member 22 surrounding the propeller hub 13, from the annular grooves 17 and 19. A valve 23 having two end lands 24 and 25 and a central land 26, control the passages 20 and 21. The end lands 24 and 25 are shown to be in registry with drain lines 27 and 28 joined in a common drain line 29. The land 26 is shown in registry with a line 30 adapted to supply fluid under pressure from a suitable pump 31.

The line 21 has a restriction 32 and a spring-controlled ball valve 33 passing fluid through the line 21 from left to right. In bypassing relation to the restriction 32 and the valve 33 is a line 33a in which there are a restriction 34 and a spring-controlled ball valve 35 passing fluid through the line 21 from right to left. In bypassing relation to the aforementioned restrictions and spring valves is a line 36 in which there is positioned a valve 37 that may be opened at will to allow free passage of fluid through the line 21 in both directions by way of the line 36.

A gear 38, which is suitably driven by means not shown, at a speed proportional to the speed of the propeller 10, carries centrifugal weights 39 pivoted at 40 on the gear. Outward movement of the weights 39 with increase in propeller speed is resisted by a spring 41 acting against inwardly extending portions 42 of the weights. One end of the spring 41 is controlled by a manually rotatable member 43 adapted for use as a selector of speeds at which the propeller 10 is to operate. A valve 44 has a flange 45 held between one end of the spring 41 and the weight portions 42. Valve 44 has a long circumferential depression 46 in constant communication with a line 47 leading from a valve body 48 surrounding the valve 44 to a reservoir of fluid supply 49. An axial passage 50 in the valve 44 terminates in a radial portion 51 at one end in communication with a line 52 leading from the delivery side of the pump 31. The other end of the axial passage 50 terminates in a radial passage 53 selectively in communication with lines 54 and 55 leading to opposite ends of a cylinder 56. The common drain line 29 leads to the reservoir 49, and a line 57 leads from the fluid reservoir 49 to the intake side of the pump 31. A pressure regulator 58 is connected in bypassing relation with the pump 31. A line 58ª leads from the base of the valve body 48 to the source of fluid supply 49.

Slidably mounted in the cylinder 56 is a piston 59 having a rod 60 extending through an end of the cylinder and connected at 61 with a stem 62 on the valve 23 and in a slot 64 in a lever arm 65 pivoted at 66. The lever arm 65 has a projection 67 engageable with the base of the valve body 48.

When the speed of the propeller is that for which the device 43 is set, the weights 39 are positioned so as to cause the valve 44 to be positioned with respect to the valve body 48, as shown in Fig. 1, so that the portion 53 of the axial passage 50 communicates with neither of the passages 54 and 55 leading to the cylinder 56. These passages are blocked, and the piston 59 is held against movement with respect to the cylinder 56. Thus the central land 26 blocks the line 30 leading from the delivery side of the pump 31, and the end lands 24 and 25 cover the drain lines 27 and 28. Thus there can be no movement of fluid into or out of the lines 20 and 21, and the vane 12 and the propeller blades 11 are held against adjustment. Suppose now that the pilot desires a higher propeller speed. He will rotate the manual device 43 to lower the upper end of the spring 41. The spring 41 will lower the valve 44 with respect to the valve body 48, causing the passage 50—51—52 to be placed in communication with the line 54 leading to the upper end of the cylinder 56. Thus fluid under pressure will be supplied from the pump 31 to the upper end of the piston 59. The line 55 connected to the lower end of the cylinder 56 will be placed in communication with the circumferential depression 46 on the valve 44, and fluid below the piston 59 may pass through the passage 55, valve depression 46, and line 47 to the source of fluid supply 49. The piston 59 moves downward and by acting through the piston rod 60 and valve stem 62, moves the valve 23 downward causing the supply line 30 to be placed in communication with the line 20 leading through the line 16 to the side of the chamber 15 to the right of the vane 12. The line 21 is placed in communication with the drain line 27. The vane 12 is moved counterclockwise, because fluid under pressure is supplied to its right side, and its left side is connected to the drain. The blades 11 are adjusted so as to cause a reduction in pitch, permitting an increase in propeller speed.

The speed at which the vane 12 may move counterclockwise is limited by the speed at which fluid may pass to drain through the restriction 32. The valve 33 opens at this time. The valve 35 is held shut, and no fluid may pass through the restriction 34.

It should be mentioned that when the piston 59 moved downwards as aforesaid, it caused downward movement of the right end of the lever arm 65. This lowered the lever projection 67, allowing the valve body 48 to be lowered, and thus the relative position of the valve 44 and the valve body 48 of Fig. 1 was restored, in which further relative movement of the piston 59 with respect to the cylinder 56 is prevented.

As previously stated, the limited speed of the vane 12 limits the rate of change of propeller pitch. This prevents an undesirable slowing down of the airplane, which would result from a too rapid reduction in propeller torque due to reduction in propeller pitch.

When the airplane propeller 10 finally reaches the new speed for which the manual device 43 is set, the weights 39 will return upwards to the position of Fig. 1, causing the valve 44 to move upwards with respect to the valve body 48. This causes the lines 55 to be placed in communication with the valve passage 51—50—53 and the delivery side of the pump 31, and the line 54 to be below the lower end of the valve 44, thereby causing the line 54 to drain to the source of fluid supply 49 by way of the line 58ª. The result is that the piston 59 moves upward returning the valve 23 to the position shown in Fig. 1, in which the central land blocks the supply line 30 and the end lands 24 and 25 block the drain lines 27 and 28. Thus the vane 12 is held against movement, and the propeller pitch is fixed. Upward movement of the piston 59 causes upward movement of the right end of the lever arm 65 and the lever projection 67 producing upward movement of the valve body 48 and bringing about return to the relative position of valve 44 and valve body 48 of Fig. 1, in which lines 54 and 55 are blocked and the piston 59 is held against movement with respect to the cylinder 56.

If the pilot desires to reduce the propeller speed, he adjusts the manual device 43 in such a way as to permit the upper end of the spring 41 to rise. This action lowers the spring pressure on the weights 39 allowing the weight extensions 42 to move upward to adjust the valve 44 upward with respect to the valve body 48. The line 55 leading to the lower side of the piston 59 is connected with the passage 51—50—53 and the delivery side of the pump 31, and the line 54 leading to the upper side of the piston 59 is connected to drain by way of the line 58ª and the source of fluid supply 49. The piston 59 and the valve 23 are moved upwards. Also the right end of the lever arm 65 and the projection 67 are moved upwards, causing the valve body 48 to be moved upwards and to bring about a return to the relative position of valve 44 and the valve body 48 of Fig. 1, in which lines 54 and 55 are blocked and the piston 59 is held against movement. Now the supply line 30 is in communication with the lines 21 and 18 and the left side of the vane 12, and the lines 20 and 16 and the right side of the vane 12 are in communication with the drain line 28. Thus there is movement of the vane 12 in a clockwise direction, and the pitch of the propeller blades 11 is increased to reduce the speed of the propeller. Fluid under pressure may pass from the supply line 30 to the line 21 only by way of the spring valve 35 and restriction 34, for the valve 33 is held shut at this time. The restriction 34 limits the speed at which the vane 12 may move clockwise and thus the rate at which the pitch of the propeller may be increased. Since the rate of increase of propeller pitch is limited, the rate of increase of load on the propeller is also limited, and thus overloading is avoided that would be due to a too rapid increase in propeller pitch and a too low reduction in propeller speed due to the large mass of rotating parts such as a gas turbine driving propeller and an air compressor driven by the gas turbine and supplying such pressure air combinable with fuel for production of hot gases driving the gas turbine. Now the slow increase in propeller pitch matches the slow decrease in propeller speed, and overloading is avoided.

As the propeller speed is lowered, the weights 39 move inward causing the weight extensions 42 and the spring 41 to move the valve 44 downwards with respect to the valve body 48. Thus the line 54 is connected to the delivery side of the pump 31 by way of the passage 51—50—53, and the line 55 is connected to the source of fluid supply 49 by way of the line 47 and the circumferential depression 46. Accordingly, the piston 59 is moved upwards to return the valve 23 to the position of Fig. 1, in which the central land 26 blocks the supply line 30 and the end lands 24 and 25 block the drain lines 27 and 28. Thus the vane 12 is held against movement, and further increase in propeller pitch is stopped. Downward movement of the piston 59 produces downward movement of the right end of the lever 65 and the lever projection 67 permitting downward movement of the valve body 48. Thus there is a return to the relative position of valve 44 and valve body 48 of Fig. 1, in which lines 54 and 55 are blocked, and the piston 59 is held against movement.

It is to be noted that the restriction 32 controls speed of the vane 12 in one direction, and the restriction 34 controls speed of the vane in the other direction. Thus different speeds in the two directions may be employed, because there are different reasons for limiting increase of propeller pitch and decrease of propeller pitch for decrease of propeller speed and increase of propeller speed.

Fig. 1 shows valve 37 to be closed. When this valve has opened, free passage of fluid into and out of the line 21 is permitted, and the restrictions 32 and 34 have no effect upon the rate of movement of the vane 12. Thus the blade pitch may be adjusted as fast as the fluid can move the vane 12. It may be desirable to operate under these conditions, for example, when the airplane is approaching a field for a landing. At this time the plane is operated preferably by full propeller speed and reduced load. If just before landing the pilot decides not to land, he increases the fuel rate. The increase in fuel rate tends to result in an increase in speed, and unless the governor can act quickly to maintain the maximum speed for which the propeller is set, the speed may go too high and cause damage to the power plant of the airplane. Consequently, it is important that there be no limitation on the sensitivity of the propeller governor such as would be provided by the restrictions 32 and 34. Under these conditions the restrictions are rendered ineffective by opening of the valve 37, and now the governor may act quickly to keep the propeller at the speed for which the governor is set.

Figure 2:
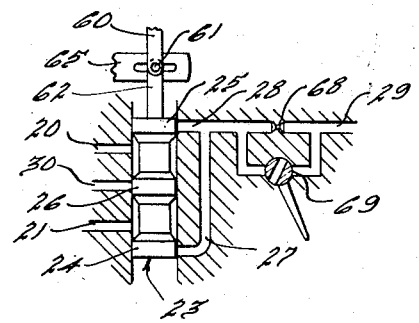
Fig. 2 is a schematic view of a modified form of governor control.

Fig. 2 shows a modification in which there are no restrictions and spring-controlled valves associated with the line 21, but a restriction 68 is placed in the common drain line 29. This single restriction 68 will slow movement of the vane 12 in both directions, and it is unnecessary to employ a spring-controlled valve in conjunction with it. This restriction is suitable for arrangements in which it is not necessary to have different rates of movement of the vane 12 in two directions. A valve 69 in parallel with the restriction 68 is adapted when open to render the restriction ineffective to slow the speed of movement of the vane 12.

It should be noted that magnitude of the speed change to be effected determines the rate at which the propeller pitch changes. If the speed change is small, the valve 44 is moved a small amount, the piston 59 moves only a small amount to restore the sleeve valve 48 to its original position with respect to the valve 44 in which further movement of the piston 59 is prevented. The piston 59 in moving only a small amount moves the valve 23 only a small amount. The result is that the drain line 27 or 28 and the pressure line 30 are only partially uncovered by the land 24 or 25 and the land 26, and these lines are restricted at these lands so that the speed at which vane 12 moves is limited.

If the speed change to be effected is large, there is no restriction of the drain line 27 or 28 and the pressure line 26 by the valve lands, and the propeller-pitch-controlling vane 12 moves at a rapid rate until the amount of speed change still to be effected is relatively small. By this time the valve 44 will have approached its original position of Fig. 1, causing the piston 59 to make the valve 23 approach the closed position of Fig. 1. At this time the valve lands will be partially covering the pressure line 30 and the drain lines 27 and 28, thereby restricting the rate of flow in these lines and the speed of movement of the pitch vane 12.

The mode of speed change just described is effective even when the valve 37 or the valve 69 is opened to render ineffective the delaying functions of the restrictions 32, 34, and 68.

The inventive concepts of the present invention illustrated, on the one hand, by the restrictions 32 and 34, one-way valves 33 and 35, and the by-pass valve 37 of Fig. 1 and, on the other hand, by the restriction 68 and the by-pass valve 69 of Fig. 2, are not limited to use with a propeller-pitch-changing apparatus such as that illustrated.

We claim:

1. In combination, means adjustable to various positions representing various desired speeds of a propeller, means shiftable in position in response to changes in speed of the propeller, yieldable means engaged by the speed-representing means and the speed-responsive means mutually and forming a connection therebetween so as to make the setting of the speed-representing means predetermine the propeller speed at which the speed-responsive means will occupy a given position, a member adjustable to different positions to adjust the propeller pitch, means forming passages alternately effective to supply pressure fluid from a source to one side or the other of the member and to connect the opposite side to drain to shift the member in one direction or the other, said passages including a valve therein shiftable to extreme positions in which one side or the other of the member is connected to fluid under pressure and the other on the one side of the member is connected to drain in the above described manner or to an intermediate position in which fluid is locked against both sides of the member, a piston connected for movement with the valve, conduit means supplying fluid from a source under pressure to one side or the other of the piston and connecting the opposite side to drain to shift the piston and the valve in one direction or the other and including therein a pair of cooperating valve parts relatively positionable so as to connect the piston to fluid under pressure and drain as aforesaid for shifting the same in one direction or the other or to block the piston to fluid under pressure and drain for holding the piston against movement, means connecting one valve part with the speed-responsive means to make the said one valve part assume a position dependent upon the difference between the actual propeller speed and the propeller speed for which the speed-representing means is set, means connecting the other valve part for movement with the piston for causing a shift of the piston due to a shift of the said one valve part to produce a shift of the said other valve part to a position relative to the said one valve part in which the piston is held against movement by being blocked to fluid under pressure and to drain, and means forming a restriction in one of said passages for retarding the flow of fluid therein thereby limiting the rate of change of propeller pitch.

2. In combination, means adjustable to various positions representing various desired speeds of a propeller, means shiftable in position in response to changes in speed of the propeller, yieldable means engaged mutually by the speed-representing means and the speed-responsive means and forming a connection therebetween to make the setting of the speed-representing means predetermine the propeller speed at which the speed-responsive means will occupy a given position, a member adjustable to different positions to adjust th propeller pitch, means forming passages alternately effective to supply pressure fluid from a source to one side or the other of the member and to connect the opposite side to drain to shift the member in one direction or the other, said passages including a valve shiftable to extreme positions in which one side or the other of the member is connected as aforesaid to fluid under pressure and the other on the one side of the member is connected to drain or to an intermediate position in which fluid is locked against both sides of the member, a pair of cooperating parts each independently movable with respect to each other, a pressure differential actuated fluid motor having a pressure movable member connected for movement with the valve and controlled by the cooperating parts so as to cause the relative positions of the parts to shift the pressure movable member and the valve in one direction or the other or to hold it against movement, means connecting one of the cooperating parts with the speed-responsive means to make the said one part assume a position dependent upon the difference between actual propeller speed and the speed for which the speed-representing means is set, means connecting the other part with the valve for causing a shift of the valve to produce a shift of the said other part to a position relative to the said one part in which the valve is held against movement, and means forming a restriction in said passage on the fluid flowing with respect to the pitch-changing member for limiting the rate of change of propeller pitch.

3. In combination, means adjustable to various positions representing various desired speeds of a propeller, means shiftable in position in response to changes in speed of the propeller, yieldable means engaged by the speed-representing means and the speed-responsive means and forming a connection therebetween to make the setting of the speed-representing means predetermine the propeller speed at which the speed-responsive means will occupy a given position, means for adjusting the pitch of the propeller, fluid means connecting the speed-responsive means and the pitch-setting means to regulate the pitch of the propeller for maintaining a predetermined propeller speed and including a pressure differential actuated fluid motor having a pressure movable member for adjusting control valving, said fluid means having associated therewith service conduit for the pitch setting means and including control valving means connected for movement of adjustment by said pressure movable member and operatively interconnecting the pitch setting means and said service conduit, means so associated with the fluid means as to be interposed in the service conduit for generally limiting the rate of change of propeller pitch in both directions of movement, said last-named means comprising means forming a first restriction incorporated in the fluid path of the fluid means intermediate the control valving and pitch setting means for limiting the rate of increase of propeller pitch, and means forming a second restriction associated with the fluid means intermediate the control valving and pitch-setting means for limiting the rate of decrease of propeller pitch.

4. In combination, means adjustable to various positions representing various desired speeds of a propeller, means shiftable in position in response to changes in speed of the propeller, yieldable means engaged by the speed-representing means and the speed responsive means and forming a connection therebetween to make the setting of the speed-representing means predetermine the propeller speed at which the speed-responsive means will occupy a given position, means for adjusting the pitch of the propeller, fluid means connecting the speed-responsive means and the pitch-setting means to regulate the pitch of the propeller for maintaining a predetermined propeller speed and including a differential pressure actuated fluid motor having a pressure movable member for adjusting control valving, said fluid means having associated therewith service conduit for the pitch setting means and including control valving means controlled by said pressure movable member and operatively interconnecting the pitch setting means and said service conduit, means forming a restriction so incorporated in the fluid path of the fluid means as to be interposed intermediate the service conduit and control valving means for generally limiting the rate of change of propeller pitch, means forming a first restriction associated with the fluid means intermediate the control valving and pitch-setting means for limiting the rate of increase of propeller pitch, means forming a second restriction incorporated in the fluid path of the fluid means intermediate the control valving and pitch-setting means for limiting the rate of decrease of propeller pitch, and bypass means connected to said service conduit across said restrictions for rendering the restrictions incapable of limiting the rate of change of propeller pitch.

5. In combination, means adjustable to various positions representing various desired speeds of a propeller, means shiftable in position in response to changes in speed of the propeller, yieldable means engaged by the speed-representing means and the speed-responsive means and forming a connection therebetween to make the setting of the speed-representing means predetermine the propeller speed at which the speed-responsive means will occupy a given position, a member adjustable to different positions to adjust the propeller pitch, means forming passages alternately effective to supply pressure fluid from a source to one side or the other of the member and to connect the opposite side to drain to shift the member in one direction or the other, said passages including therein a valve shiftable to extreme positions in which one side or the other of the member is connected as aforesaid to fluid under pressure and the other on the one side of the member is connected to drain or to an intermediate position in which fluid is locked against both sides of the member, a piston connected for movement with the valve, conduit means supplying fluid from a source under pressure to one side or the other of the piston and connecting the opposite side to drain to shift the piston and the valve in one direction or the other, said conduit means including a pair of cooperating valve parts relatively positionable therein so as to connect the piston to fluid under pressure and to drain as aforesaid for shifting the same in one direction or the other or to block the piston to fluid under pressure and drain for holding the piston against movement, means connecting one valve part with the speed-responsive means to make the said one valve part assume a position dependent upon the difference between the actual propeller speed and the propeller speed for which the speed-representing means is set, means connecting the other valve part for movement with the piston for causing a shift of the piston due to a shift of the said one valve part to produce a shift of the said other valve part to a position relative to the said one valve part in which the piston is held against movement by being blocked to fluid under pressure and to drain, said passages having means forming a restriction in the communication on the flow of fluid with respect to the pitch-controlling member on the side of the valve away from the pitch-controlling member for limiting the rate of change of propeller pitch, and bypass means connected to said passages for rendering the restriction incapable of limiting the rate of change of propeller pitch.

6. In combination, means adjustable to various positions representing various desired speeds of a propeller, means shiftable in position in response to changes in speed of the propeller, yieldable means engaged by the speed-representing means and the speed-responsive means and forming a connection therebetween effective to make the setting of the speed-representing means predetermine the propeller speed at which the speed-responsive means will occupy a given position, a member adjustable to different positions to adjust the propeller pitch, means forming passages alternately effective to supply pressure fluid from a source to one side or the other of the member and to connect the opposite side to drain to shift the member in one direction or the other, said passages including a restriction and a valve therein in series, said valve being shiftable to extreme positions in which said restriction opposes flow therein so as to limit the rate of change of propeller-pitch and in which one side or the other of the member is connected to fluid under pressure and the said other or the one side of the member is connected to drain in the above described manner or to an intermediate position in which fluid is locked against both sides of the member, a piston connected for movement with the valve, conduit means supplying fluid from a source under pressure to one side or the other of the piston and for connecting the opposite side to drain to shift the piston and the valve in one direction or the other, said conduit means including a pair of cooperating valve parts relatively positionable so as to connect the piston to fluid under pressure and drain for shifting the same in one direction or the other in the above described manner or to block the piston to fluid under pressure and drain for holding the piston against movement, means connecting one valve part with the speed-responsive means to make the said one valve part assume a position dependent upon the difference between the actual propeller speed and the propeller speed for which the speed-representing means is set, means connecting the other valve part for movement with the said valve and with the piston for causing a shift of the piston due to a shift of the said one valve part to produce a shift of the said other valve part to a position relative to the said one valve part in which the piston is held against movement by being blocked to fluid under pressure and to drain, and restriction bypass means associated with said passages for rendering the restriction incapable of limiting the rate of change of propeller pitch.

7. In combination, means adjusting to various positions representing various desired speeds of a propeller, means shiftable in position in response to changes in speed of the propeller, yieldable means engaged by the speed-representing means and the speed-responsive means and forming a connection therebetween effective to make the setting of the speed-representing means predetermine the propeller speed at which the speed-responsive means will occupy a given position, a member adjustable to different positions to adjust the propeller pitch, means forming passages alternately effective to supply pressure fluid from a source to one side or the other of the member and to connect the opposite side to drain to shift the member in one direction or the other, said passages including a valve shiftable to extreme positions in which one side or the other of the member is connected to fluid under pressure and the other on the one side of the member is connected to drain in the above described manner or to an intermediate position in which fluid is locked against both sides of the member, a pair of cooperating parts, means connected for movement with the valve and controlled by the cooperating parts so as to cause the relative positions of the parts to shift the valve in one direction or the other or to hold it against movement, means connecting one of the cooperating parts with the speed-responsive means to make the said one part assume a position dependent upon the difference between actual propeller speed and the speed for which the speed-representing means is set, means connecting the other part with the valve for causing a shift of the valve to produce a shift of the said other part to a position relative to the said one part in which the valve is held against movement, means forming a first restriction in said passages on the fluid flowing with respect to the pitch-changing member for limiting the rate of increase of the propeller pitch, means forming a second restriction in said passages on the fluid flowing with respect to the pitch changing member for limiting the rate of decrease of the propeller pitch, and bypass means for rendering the restrictions incapable of limiting the rate of change of propeller pitch.

PAUL T. NIMS.
BRENT C. JACOB, Jr.

References Cited in the file of this patent

UNITED STATES PATENTS

| Number | Name | Date |
|---|---|---|
| 840,876 | Steedman | Jan. 8, 1907 |
| 1,423,786 | Zoelly et al. | July 25, 1922 |
| 1,977,490 | Sawyer | Oct. 16, 1934 |
| 1,990,814 | Castro | Feb. 12, 1935 |
| 2,105,843 | Preston et al. | Jan. 18, 1938 |
| 2,204,639 | Woodward | June 18, 1940 |
| 2,343,382 | Martin | Mar. 7, 1944 |
| 2,364,672 | Stevenson | Dec. 12, 1944 |
| 2,389,274 | Pearsall, Jr., et al. | Nov. 20, 1945 |
| 2,391,323 | Martin | Dec. 18, 1945 |
| 2,423,191 | Kopp | July 1, 1947 |
| 2,424,559 | Drake | July 29, 1947 |

FOREIGN PATENTS

| Number | Country | Date |
|---|---|---|
| 212,020 | Switzerland | Oct. 31, 1940 |
| 703,319 | Germany | Mar. 6, 1941 |
| 804,058 | France | July 27, 1936 |
| 885,782 | France | June 7, 1943 |
| 886,631 | France | Oct. 20, 1943 |